United States Patent
Smatloch et al.

(10) Patent No.: US 8,312,721 B2
(45) Date of Patent: Nov. 20, 2012

(54) EXHAUST GAS ASSEMBLY

(75) Inventors: Christian Smatloch, Paderborn (DE); Elmar Grussmann, Altenbeken-Buke (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 378 days.

(21) Appl. No.: 12/822,654

(22) Filed: Jun. 24, 2010

(65) Prior Publication Data

US 2011/0131985 A1 Jun. 9, 2011

(30) Foreign Application Priority Data

Jun. 24, 2009 (DE) .......................... 10 2009 030 482

(51) Int. Cl.
*F02B 33/44* (2006.01)
(52) U.S. Cl. ............ 60/612; 60/602; 60/605.2; 415/102
(58) Field of Classification Search .................... 60/602, 60/605.2, 612; 415/102; 417/406
See application file for complete search history.

(56) References Cited

U.S. PATENT DOCUMENTS 8,206,133 B2 * 6/2012 Mudel ........................... 417/406

FOREIGN PATENT DOCUMENTS

| DE | 19709879 A1 | 9/1998 |
|---|---|---|
| DE | 19822874 A1 | 11/1999 |
| DE | 19837978 B4 | 11/1999 |
| DE | 29909018 U1 | 11/2000 |
| DE | 10022052 A1 | 3/2001 |
| DE | 10218436 C1 | 8/2003 |
| DE | 10230934 A1 | 1/2004 |
| DE | 10307028 B3 | 5/2004 |
| EP | 1426557 A1 | 6/2004 |

OTHER PUBLICATIONS

"Der neue BMW-Sechszylinder-Dieselmotor mit Stufenaufladung", in: MTZ May 2005, Year 66. 2005.

* cited by examiner

*Primary Examiner* — Ching Chang
(74) *Attorney, Agent, or Firm* — Henry M. Feiereisen, LLC

(57) ABSTRACT

An exhaust gas assembly includes an exhaust gas manifold which is connected with an exhaust gas inlet of a manifold and an adjusting member arranged in the manifold. The adjusting member is configured to supply exhaust gas to a low pressure connection and/or a high-pressure connection of the manifold, wherein on the high-pressure side a high-pressure turbine housing is connected to the manifold and on the low pressure side a low pressure turbine housing is connected to the manifold. A connecting channel extends through the manifold and connects a high-pressure exhaust gas outlet) of the high-pressure turbine housing with a low pressure exhaust inlet) of the low pressure turbine housing.

12 Claims, 2 Drawing Sheets

EXHAUST GAS ASSEMBLY

CROSS-REFERENCES TO RELATED APPLICATIONS

This application claims the priority of German Patent Application, Serial No. 10 2009 030 482.7, filed Jun. 24, 2009, pursuant to 35 U.S.C. 119(a)-(d), the content of which is incorporated herein by reference in its entirety as if fully set forth herein.

BACKGROUND OF THE INVENTION

The present invention relates to an exhaust gas assembly for an internal combustion engine.

The following discussion of related art is provided to assist the reader in understanding the advantages of the invention, and is not to be construed as an admission that this related art is prior art to this invention.

Internal combustion engines for automobiles are increasingly charged using turbochargers to reduce fuel consumpty. Because the weight of the turbocharger also affects the fuel consumption, is a goal to develop particularly lightweight and compact exhaust gas systems, in particular in view of the steadily decreasing installation space within the engine compartment. Turbochargers are subjected to significant mechanical and more particular very high thermal loads during operation. In order to nevertheless achieve a useful service life, attempts have been made to eliminate in the turbocharger thermally induced stress and to increase the fatigue limit under reverse stress. DE 100 22 052 A1 describes one exemplary solution for decoupling the components carrying exhaust gas and the supporting or external sealing structures. This results in components having low surface temperatures.

Another significant goal is an increase in the power density, in particular of diesel engines. The charging technique used in an internal combustion engine represents here an important feature. Existing systems already employ two turbochargers arranged in stages to generate sufficient charging pressure even at low rpm and simultaneously sufficient torque (DE 198 37 978 B4). A combination of a mechanical compressor and a turbocharger has also been proposed (AutoBild 36/2005, page 16). However, the arrangement of the components is complex and control is difficult. The surface area of the components also increases significantly, which results in strong cooling of the exhaust gas. This is detrimental for the desired low emission values, since a downstream catalytic converter operates optimally only at higher exhaust gas temperatures. On the other hand, high loads generate a lot of heat which is introduced into the engine compartment due to the increased surface area. This can lead to problems with various plastic components and additional assemblies located in the engine compartment.

MTZ, 5/2005, Year 66, Pages 334-344, describes a stepped charger for a six cylinder diesel engine, wherein two series-produced turbochargers are connected to an exhaust gas manifold and augmented by corresponding switching and control members. However, this approach fragments the exhaust gas assembly, which increases the installation complexity due to the screw connections and the surface area and hence also cools the exhaust gases.

It would therefore be desirable and advantageous to provide an improved compact and lightweight charger capable of reducing excessive cooling of the exhaust gas even with two-stage chargers to reduce thermal loss and minimize weight.

SUMMARY OF THE INVENTION

According to one aspect of the present invention, an exhaust gas assembly includes a manifold constructed as a cast component and having a high-pressure connection and a low-pressure connection, and an exhaust gas inlet and an exhaust gas outlet, an exhaust gas manifold having an inner housing and an outer housing, wherein the exhaust gas manifold is connected to the exhaust gas inlet, and an adjusting member arranged inside the manifold, with the adjusting member configured to supply exhaust gas to the low pressure connection or the high-pressure connection, or both, of the manifold. The exhaust gas assembly further includes a high-pressure turbine having a high-pressure turbine housing connected to the high-pressure connection of the manifold and a low pressure turbine having a low-pressure turbine housing connected to the low-pressure connection of the manifold, wherein the high-pressure turbine housing and the low pressure turbine housing each have respective inner and outer housings made of sheet metal shells. A connecting channel extends through the manifold and connects a high-pressure exhaust gas outlet of the high-pressure turbine housing with a low pressure exhaust inlet of the low pressure turbine housing.

The exhaust gas assembly according to the invention has four components: an exhaust gas manifold, a manifold and two turbines. Initially, exhaust gas exiting the internal combustion engine flows through an exhaust gas manifold, which conveys the collected exhaust gas to a manifold. The manifold is the central element of the exhaust gas assembly. A high-pressure turbine housing and a low-pressure turbine housing are directly connected to the manifold. The manifold therefore has a high-pressure connection and a low-pressure connection for the respective turbines. In addition, a connecting channel, which extends from the high-pressure turbine to the low-pressure turbine and transfers the exhaust gas exiting the high-pressure turbine to the low-pressure turbine, extends through the manifold. The degree to which exhaust gas is supplied to the high-pressure turbines and the low-pressure turbine is affected, among others, by an adjusting member which is also located in the manifold.

Due to its multiple functions, the manifold is a complex component, which is therefore preferably produced with a primary mold, i.e., it is a cast component. Conversely, the inner and outer housing of the low-pressure and high-pressure turbine are made of shaped sheet-metal shells. A fitting to the downstream exhaust gas system can also be connected to these sheet-metal shells. Frequently, the term "built housings" is used to differentiate from "cast housings."

As a result of the direct connection between the two turbines and the central manifold, the exhaust gas assembly of the invention is advantageously lightweight and compact. The turbine housings are very close to each other, which shortens the flow paths between the two turbines. The surface area of the entire exhaust gas assembly is hence significantly reduced. Due to the reduced surface area, less heat is lost, which improves the startup characteristic of the catalytic converter during startup of the internal combustion engine and reduces heat loss under very high loads. In addition, with the short flow paths and the compact construction, both weight and installation space can be reduced inside the small engine compartment of an automobile.

In an advantageous embodiment, the manifold has a bypass channel, through which exhaust gas can be conveyed from the high-pressure exhaust gas outlet of the high-pressure turbine housing to an exhaust gas outlet of the manifold while circumventing the low-pressure turbine. One important aspect in this compact construction is that the bypass channel terminates directly in the exhaust gas outlet of the distribution assembly, thereby obviating the need for external lines for the bypass outside the distribution assembly.

The bypass channel can be closed off by a bypass valve which, like the adjusting member, is arranged directly inside the manifold. Additional installation space may be required only for the necessary actuators that control the bypass valve.

The exhaust gas manifold an air gap disposed between its inner housing and its outer housing to provide thermal insulation. Each of the low-pressure and the high-pressure turbine housings also has a respective air gap which is also located between the corresponding inner and outer housing.

The sheet-metal thickness of the inner housings is usually significantly smaller than the sheet-metal thickness of the outer housings. The inner housing then absorbs less heat, which positively affects the startup characteristic of the catalytic converter and also positively affects the exhaust gas temperature. The corresponding inner housings have primarily the function to convey the exhaust gas, whereas the outer housings of the corresponding components have merely a supporting function. In addition to the supporting function, the outer housings provide a seal between the exhaust gas assembly and the environment.

Advantageously, the three existing air gaps remain separate from one another. In particular, the air gap in the exhaust gas manifold is separate from the air gaps of the low-pressure and the high-pressure turbine housings. Heat introduced into the air gap of the exhaust gas manifold is then not immediately transferred to the air gaps of the low-pressure and high-pressure turbine housings. This reduces the thermal load on the two turbines.

The exhaust gas assembly of the invention is constructed entirely without screw connections. Screw connections require flanges which increase the weight and may cause leaks. The components of the exhaust gas assembly according to the invention are preferably interconnected with a material connection, in particular with welds. The material connection does not result in leaks, eliminates heavy flanges and allows narrow and compact connecting regions, thereby reducing the overall weight.

The welded outer housings of the components of the exhaust gas manifold, in combination with the manifold, form the supporting structure. This structure is assisted by support flanges arranged in the region of the low-pressure and high-pressure turbines for connecting the exhaust gas assembly with the fresh air intake tract of the turbine. The support flanges additionally reinforce the sheet-metal shells of the outer housings.

Because the air gaps of the exhaust gas manifold and the turbines are advantageously separate from one another, the outer housings of the low-pressure and high-pressure turbine stages may be connected with the outer housing of the exhaust gas manifold by a material connection. In particular, the outer housing of the low-pressure and high-pressure turbine stage surrounds the outer housing of the exhaust gas manifold. The outer housing of the exhaust gas manifold operates as the connecting member between a head flange of the exhaust gas manifold, which is secured to the cylinder head of the internal combustion engine, and the manifold. Accordingly, the air gap also extends to the manifold. In theory, the outer housing of the high-pressure and low-pressure turbine stages could begin at this location; however, this would result in a concentration of several weld seams. In order to prevent stress peaks in this connection region, the outer housing of the low-pressure and high-pressure turbine stages is directly connected with the outer housing of the exhaust gas manifold in such a way that the outer housing of the exhaust gas manifold mates with the other aforementioned outer housings. Direct welding of the outer housings to one another produces a very rigid connection between the exhaust gas manifold and the outer housings of the turbines. The air gaps of the exhaust gas manifold and the turbines therefore overlap adjacent to the connecting regions; however, they are not connected with one another so as to allow fluid flow.

The exhaust gas assembly according to the invention can be constructed so that the inner housings of the low-pressure and high-pressure turbines are coupled with the manifold by forming a sliding seat. Thermally induced changes in the length of the individual housings can be compensated by sliding seats, thereby increasing the fatigue strength of the entire exhaust gas assembly.

Because the air gap of the turbine housings extends to the air gap of the exhaust gas manifold, the manifold is also isolated by an air gap, namely by the air gaps of the turbine housings. Most of the surface area of the manifold is isolated in this way.

The inner housing of the exhaust gas manifold can also be connected with the manifold by forming a sliding seat. The same applies to a longitudinal section of the connecting channel which is likewise connected with the manifold by forming a sliding seat. In this way, the central manifold, which is exposed to rather variable thermal loads, is shielded as much as possible from the stress caused by thermally induced length changes.

A central element of the exhaust gas assembly is therefore the cast manifold which receives the adjusting member and the bypass valve after respective mechanical machining. The manifold can also have an exhaust gas outlet, which is used for conveying the exhaust gas flowing through the exhaust gas assembly to downstream components of the exhaust system. For this reason, the low-pressure exhaust gas outlet of the low-pressure turbine can also terminate directly in an exhaust gas outlet of the manifold.

With the exhaust gas assembly according to the invention, a variety of materials can be selected depending on the thermal load and the desired stability. The central manifold is almost completely surrounded by the sheet-metal structure, thereby minimizing heat losses. Very thin inner structures, with wall thicknesses of less than 1.5 mm, improve the emission values of the connected internal combustion engine by improving the startup characteristic of the catalytic converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
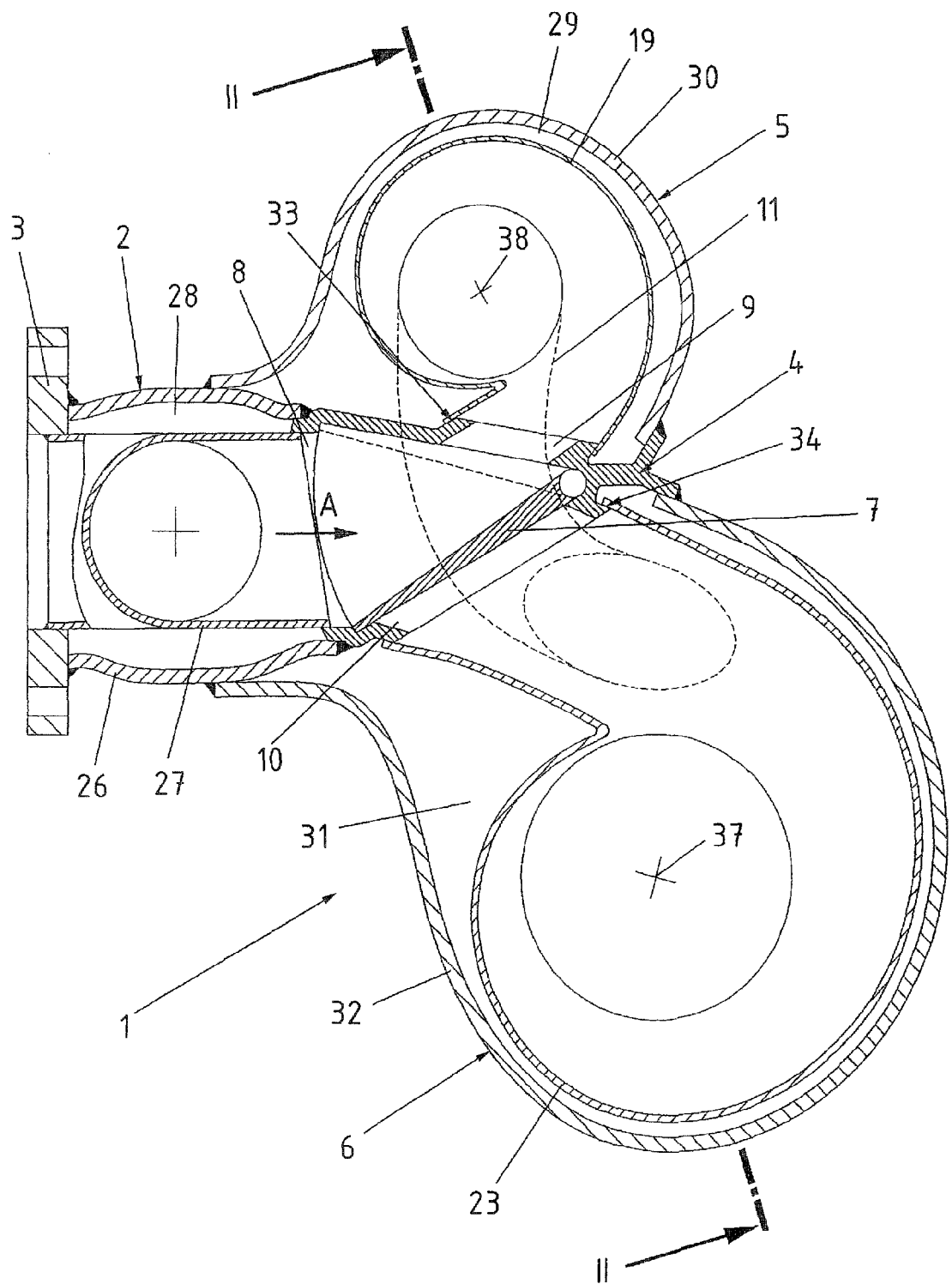
FIG. 1 shows a cross-section through the exhaust gas assembly taken along the line I-I shown in FIG. 2.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exhaust gas assembly 1 includes an exhaust gas manifold 2 which can be connected via a head flange 3 to an unillustrated internal combustion engine. The exhaust gas manifold 2 is configured for multiple flows. The cross-sectional plane I-I shows a cross-sectional view through the exhaust gas manifold 2 which terminates in a central manifold 3 produced as a cast component. A high-pressure turbine housing 5 is arranged above the manifold 4 in relation to the image plane of FIG. 1. A larger low-pressure turbine housing 6 is located below the manifold 4. The adjusting member 7 in form of a flap located inside the manifold 4 can be moved from the illustrated lower position into the upper position shown by a dashed line, thereby diverting the exhaust gas entering the manifold 4 not upward in the direction of arrow A, but rather downward. When the adjusting member 7 is in the upper position, a high-pressure connection 9 is closed, so that the exhaust gas is introduced directly via a nozzle-like low-pressure connection 10 of the manifold 4 into a low-pressure exhaust gas inlet 39 of the low-pressure turbine housing 6. The adjusting member 7 may have intermediate positions.

In the illustrated position, the exhaust gas would be conveyed from the high-pressure turbine housing 5 via a connecting channel 11, which is indicated in FIG. 1 by a dash-dotted line, to the low-pressure turbine housing 6. The arrow B shown in FIG. 2 illustrates the exhaust gas flow from the exhaust gas inlet 8 of the manifold 4 through the turbine wheel 12 of the high-pressure turbine 13, with the flow continuing via the connecting channel 11 in the direction of arrow C to a turbine wheel 14 of the low-pressure turbine 15, and from there onward in the direction of arrow D via a low-pressure exhaust gas outlet 40 of the low-pressure turbine 15, terminating in an exhaust gas outlet to 16 of the manifold 4.

The connecting channel 11 has two longitudinal sections, namely an upper longitudinal section 17 made of deep-drawn, thin-wall sheet-metal and a lower longitudinal section 22 extending in the manifold 4. The upper longitudinal section 17 is connected with an inner housing 19 of the high-pressure turbine 13 by forming a sliding seat 18 and is also connected to the high-pressure exhaust gas outlet 20. In addition, the longitudinal section 17 of the connecting channel 11 made of sheet metal is coupled via a sliding seat 21 with the manifold 4. This is feasible because the displacement directions of the sliding seats 18, 21 are different and the component is captively connected, on one hand, with the manifold 4 and, on the other hand, with the inner housing 19 of the high-pressure turbine 13.

Figure 2:
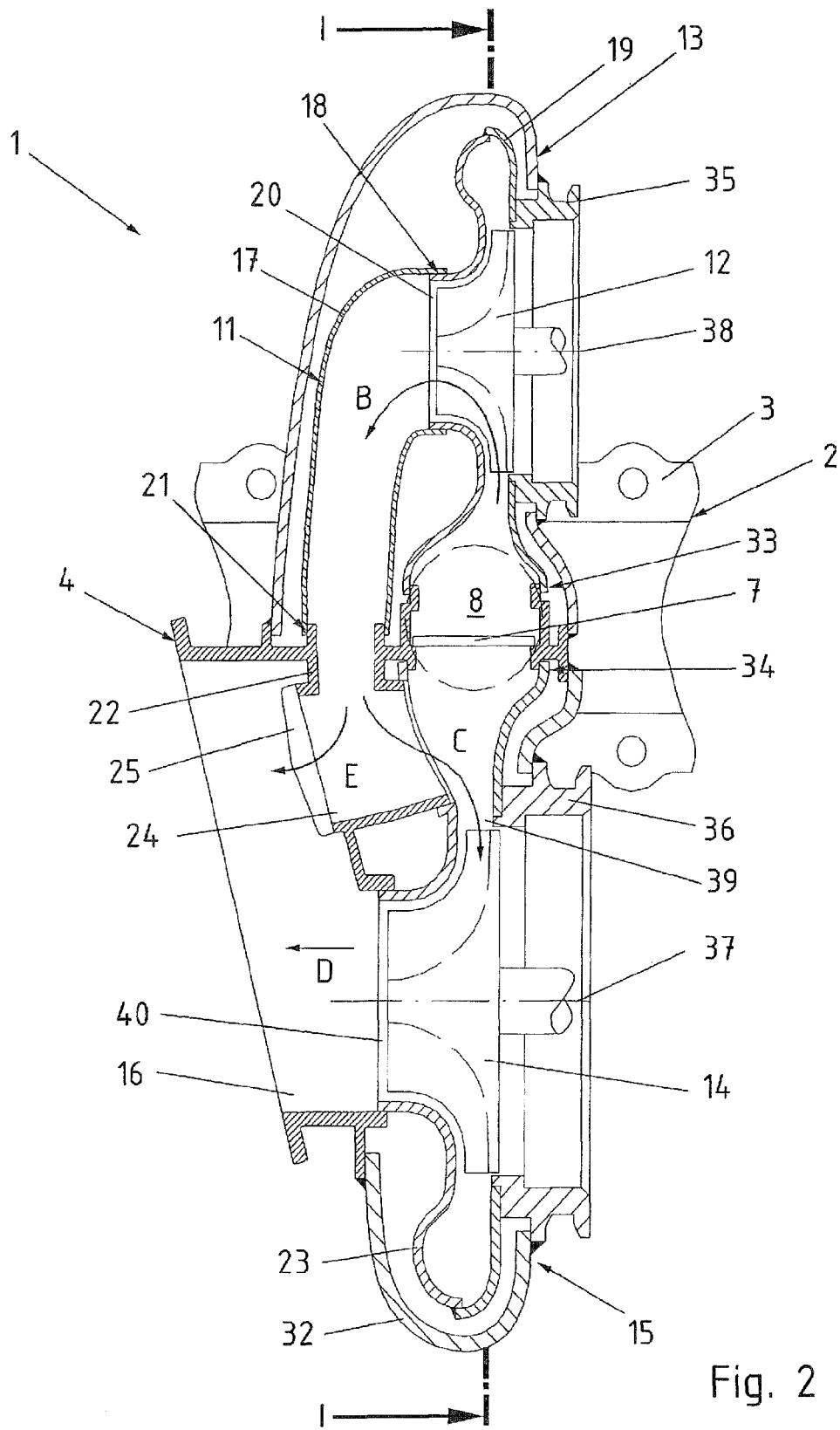
FIG. 2 shows a cross-section through the exhaust gas assembly taken along the line II-II of FIG. 1.

In addition, a bypass channel 24 is formed in the lower longitudinal section 22 of the connecting channel 11, which in the diagram of FIG. 2 is closed by a bypass valve 25. When the bypass valve 25 is opened, the exhaust gas can flow directly from the connecting channel 11 in the direction of arrow E into the exhaust gas outlet 16 of the manifold 4. The exhaust gas outlet 16 has flanges for connection to downstream components of the exhaust system.

As shown more particularly in FIG. 1, almost the entire exhaust gas assembly is isolated by air gaps. To this end, the exhaust gas manifold 2 has a sealing and supporting other housing 26 which is, on one hand, welded to the head flange 3 and, on the other hand, surrounds the exhaust gas inlet 8 of the manifold 4 which has for this purpose a step-like shoulder. An inner housing 27 is disposed inside the outer housing 26. An air gap 28 is arranged between the outer housing 26 and the inner housing 27. In this exemplary embodiment, the inner housing 27 is fixedly welded to the head flange 3 and engages via a sliding seat with the exhaust gas inlet 8 of the manifold 4. The air gap 28 is separate from an air gap 29, which is formed between the inner housing 19 and an outer housing 30 of the high-pressure turbine housing 5. The air gap 28 is also separate from an air gap 31 disposed between the inner housing 23 and a supporting outer housing 32 of the low-pressure turbine housing 6. The ends of the outer housings 30, 32 of the high-pressure and low-pressure turbines 13, 15 facing the exhaust gas manifold are welded to the outer housing 26 of the exhaust gas manifold 2. The other ends of the outer housings 30, 32 distant from the exhaust gas manifold 2 are welded to the manifold 4. These ends rest in a corresponding attachment web of the manifold 4.

As can be seen, the manifold 4 is almost completely surrounded by the housings of the high-pressure and low-pressure turbines 13, 15. It is also evident that the thickness of the sheet-metal of the outer housings 30, 32 is significantly greater than the thickness of the sheet-metal of the respective inner housings 19, 23. It should also be mentioned that the inner housings 19, 23 are configured in a conventional manner with a helical shape, so that the width of the air gaps in the housings of the high-pressure turbine 13 and the low-pressure turbine 15 varies significantly.

To keep thermal stress away from the central manifold 4, the inner housings 19, 23 of the high-pressure turbine 13 and the low-pressure turbine 15, respectively, are connected via sliding seats 33, 34 to the high-pressure connection 9 of the manifold 4 and with the low-pressure connection 10 of the manifold 4, respectively. As a result, the respective outer and inner housings 30, 19, 23, 32 of the high-pressure turbine 13 and the low-pressure turbine 15 are, on one hand, indirectly connected by way of the manifold 4. On the other hand, a connection is provided via the bearing flanges 35, 36 provided to connect the exhaust gas assembly 1 to the suction-side portion/fresh air-side portion of the support assembly.

As seen in FIG. 2, the bearing flanges 35, 36 are located in mutually parallel planes. In other words, in this exemplary embodiment, the rotating shafts 37, 38 of the turbine wheels 12, 14 are parallel to one another.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An exhaust gas assembly comprising:
 a manifold constructed as a cast component and having a high-pressure connection and a low-pressure connection, and an exhaust gas inlet and an exhaust gas outlet,
 an exhaust gas manifold having an inner housing and an outer housing, said exhaust gas manifold connected to the exhaust gas inlet,
 an adjusting member arranged inside the manifold, with the adjusting member configured to supply exhaust gas to the low pressure connection or the high-pressure connection, or both, of the manifold, a high-pressure turbine comprising a high-pressure turbine housing connected to the high-pressure connection of the manifold and a low pressure turbine comprising a low-pressure turbine housing connected to the low-pressure connection of the manifold, said high-pressure turbine housing and said low pressure turbine housing each having respective inner and outer housings made of sheet metal shells, and a connecting channel extending through the manifold and connecting a high-pressure exhaust gas outlet of the high-pressure turbine housing with a low pressure exhaust gas inlet of the low pressure turbine housing.

2. The exhaust gas assembly of claim 1, wherein the manifold has a bypass channel for introduction of exhaust gas from the high-pressure exhaust gas outlet of the high-pressure turbine housing into the exhaust gas outlet of the manifold by circumventing the low pressure turbine.

3. The exhaust gas assembly of claim 2, further comprising a bypass valve configured to close off the bypass channel.

4. The exhaust gas assembly of claim 1, wherein a first air gap is disposed between the inner housing of the exhaust gas manifold and the outer housing of the exhaust gas manifold, and wherein respective second and third air gaps are disposed between the inner and outer housings of each of the low pressure turbine housing and the high-pressure turbine housings.

5. The exhaust gas assembly of claim 4, wherein the first air gap in the exhaust gas manifold is separated from the second and third air gaps of the low pressure and high-pressure turbine housings.

6. The exhaust gas assembly of claim 1, wherein the manifold is connected by a material connection with the low pressure turbine housing, the high pressure turbine housing and the exhaust gas manifold.

7. The exhaust gas assembly of claim 1, wherein the outer housing of the low-pressure turbine housing and the outer housing of the high-pressure turbine housing are connected by a material connection with the outer housing of the exhaust gas manifold.

8. The exhaust gas assembly of claim 7, wherein the outer housing of the low-pressure turbine housing and the outer housing of the high-pressure turbine housing surround the outer housing of the exhaust gas manifold.

9. The exhaust gas assembly of claim 1, wherein the inner housing of the low-pressure turbine housing and the inner housing of the high-pressure turbine housing are connected to the manifold by a molded sliding seat.

10. The exhaust gas assembly of claim 1, wherein the inner housing of the exhaust gas manifold is connected to the manifold by a molded sliding seat.

11. The exhaust gas assembly of claim 1, wherein the connecting channel comprises a longitudinal section which is made of sheet-metal and connected to the manifold by a molded sliding seat.

12. The exhaust gas assembly of claim 1, wherein a low-pressure exhaust gas outlet of the low-pressure turbine terminates in the exhaust gas outlet of the manifold.

* * * * *